UNITED STATES PATENT OFFICE.

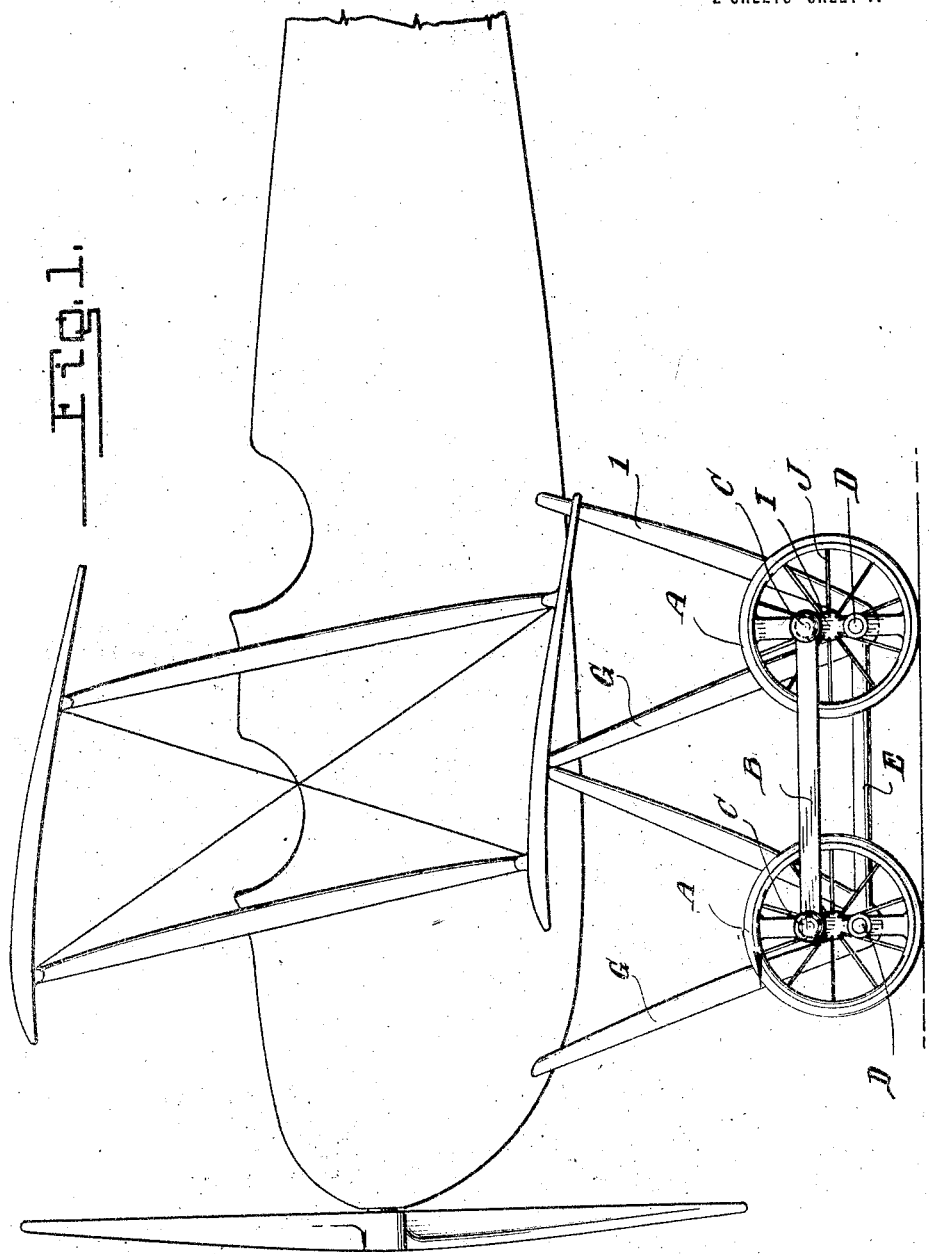

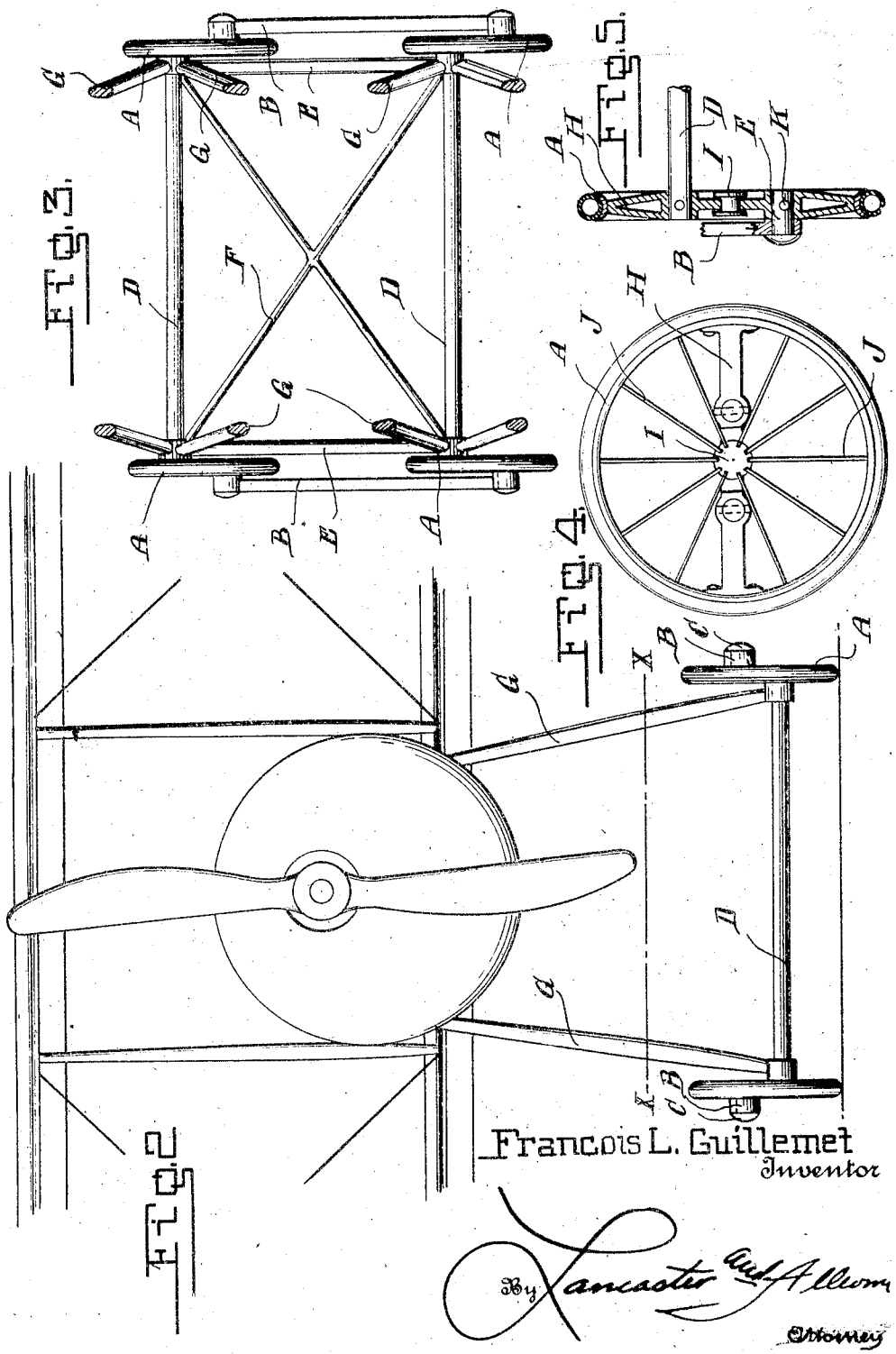

FRANÇOIS LEONIDAS GUILLEMET, OF SAN FRANCISCO, CALIFORNIA.

AEROPLANE-UNDERCARRIAGE.

1,340,483.     Specification of Letters Patent.     Patented May 18, 1920.

Application filed April 12, 1919. Serial No. 289,625.

*To all whom it may concern:*

Be it known that I, FRANÇOIS LEONIDAS GUILLEMET, a citizen of the United States, residing at San Francisco, in the county of San Francisco and State of California, have invented a new and useful Improvement in Aeroplane-Undercarriages, of which the following is a specification and the accompanying drawings a part thereof.

My invention relates to a peculiar or special form of wheels for said undercarriage, and its purpose is, first, to make an aeroplane take to the air more rapidly, and second, to stop it more shortly on alighting than obtains at present, thereby dispensing with a long course of smooth and uniform ground as now required.

The gist of the invention consists in making the main wheels eccentric, *i. e.*, eccentrically mounted on their axle, whereby the aeroplane is alternately raised and lowered a limited extent when running on the ground. These wheels are the ones usually placed at or near the center of gravity of the aeroplane and may consist of one or more pairs. Any other wheel or wheels at either or both ends of the aeroplane need not be eccentric.

In the drawings, Figure 1 is a partial side view of an aeroplane provided with eccentric wheels; Fig. 2 is a front view of the same; Fig. 3 is a sectional view on line X—X of Fig. 2 looking down; Fig. 4 is an enlarged view of one wheel, (axle and crank removed), and Fig. 5 a horizontal section through the same wheel with a crank and axle on it.

I have illustrated a set of two pairs of wheels for convenience in case of need, but it is understood that in the majority of cases one pair only would do as well or better. Each pair of wheels should be fast with its axle, so as to revolve with it, and all the wheels in a set should be connected by any suitable means to make them revolve in unison an equal number of turns, with parallelism of eccentric radii.

In the drawings, the two pairs of wheels A A are connected together by means of the parallel rods B B fitted on the cranks C C; the axles D D fit in bearings formed in a solid frame consisting of the rods E E, F F, G G, etc. Each wheel is provided with a strong piece or bar H of appropriate shape for bearing the axle D and the crank C. Also, in the center of this bar, a boss or hub is fastened or made integral and suitable disks or knobs I I at each end of it are to hold the inner end of the wire spokes J J. The axle D and crank C are held fast on the bar H by cotter pins K K, permitting removal if necessary. When there is only one pair of wheels, the parallel rods and cranks are of course dispensed with. The fastening of the wheels with their axle would permit the application of some form of friction clutch or brake on the axles for further shortening stops if convenient.

In operation, when the propeller has attained a sufficient speed, the aeroplane is released in the usual way and it will start hopping as a bird before taking flight. This hopping may somewhat retard the speed of the aeroplane forward but will urge it upward as the propelling power accumulates, with the angle of incidence of the planes intermittently increased and the aeroplane intermittently raised, thus preventing it going far before taking to the air. This should take place after a very few turns of the wheels.

In alighting, a reverse effect will take place, because the power being shut off, the remaining momentum will be promptly absorbed by the successive raising and lowering of the aeroplane in a vertical direction with its horizontally extended planes producing a powerful braking effect. This effect will also take place in starting, but it is a braking effect that will soon let go before a rising power while it will grip a dying one. This same effect disappearing for a moment every time the topmost point of the eccentrics at the axle is reached, this is when the aeroplane will leave the ground instead of dropping again.

What I claim as my invention and desire to secure by Letters-Patent is:

1. An aeroplane undercarriage comprising a frame, a pair of spaced axles carried by the frame for rotary movement, wheels eccentrically mounted on the terminals of the axles for movement therewith, and a rod connecting the wheels together for synchronous movement.

2. In an aeroplane undercarriage, the combination of a wheel including an annular rim, means providing a bore offset with respect to the center of the wheel, and radial spokes connecting said rim to the central portion of the wheel; an axle extending into the said bore of said wheel; and means connecting said axle to the body of the aeroplane, whereby an undulating motion is imparted thereto upon rotation of the wheel on the ground.

3. In an aeroplane undercarriage, the combination of a wheel including an annular rim, a diametrically disposed brace connected to said rim and providing a bore offset with respect to the center of the wheel, radially disposed spokes connected to the rim, and means connecting said spokes to said brace; an axle extending into the said bore of said wheel; and means connecting said axle to the body of the aeroplane, whereby an undulating motion is imparted thereto upon rotation of the wheel on the ground.

4. In an aeroplane undercarriage, the combination of a pair of circular ground wheels having collinear centers, an axle eccentrically connected to both of said wheels in substantially the same radius of each wheel, and a frame revolubly supporting said axle beneath the aeroplane body.

5. In an aeroplane undercarriage, the combination of a pair of circular ground wheels having collinear centers, and means connecting said wheels to the aeroplane body to impart to the latter an undulating motion during travel of said wheels over the ground.

6. In an aeroplane undercarriage, the combination of a circular ground wheel, and means having connection to said wheel eccentrically thereof and to the aeroplane body for imparting an undulating movement to the body upon rotation of said wheel over the ground.

F. LEONIDAS GUILLEMET.

Witnesses:
G. T. BRACKETT,
R. A. GUILLEMET.